United States Patent
Lee et al.

(10) Patent No.: US 7,877,223 B2
(45) Date of Patent: *Jan. 25, 2011

(54) METHOD AND APPARATUS FOR GEOMETRIC ROTOR STACKING AND BALANCING

(75) Inventors: Robert M. Lee, Magnolia, MA (US); Robert E. Parsons, Gloucester, MA (US)

(73) Assignee: Axiam, Inc., Gloucester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/470,998

(22) Filed: May 22, 2009

(65) Prior Publication Data

US 2009/0234481 A1 Sep. 17, 2009

Related U.S. Application Data

(63) Continuation of application No. 11/527,033, filed on Sep. 26, 2006, now Pat. No. 7,539,594.

(51) Int. Cl.
*G01P 3/00* (2006.01)
*G06F 15/00* (2006.01)

(52) U.S. Cl. .................................. 702/150; 702/147

(58) Field of Classification Search .............. 702/94, 702/145, 147, 150, 182; 219/121.13, 121.14, 219/121.2; 73/462; 701/124

See application file for complete search history.

(56) References Cited

U.S. PATENT DOCUMENTS

| 4,131,387 A | 12/1978 | Kazin et al. |
| 5,373,922 A | 12/1994 | Marra |
| 5,414,929 A | 5/1995 | Floser et al. |
| 5,537,861 A | 7/1996 | Seitelman et al. |
| 5,538,258 A | 7/1996 | Hager et al. |
| 5,564,656 A | 10/1996 | Gilbert |
| 5,636,848 A | 6/1997 | Hager et al. |
| 5,689,435 A | 11/1997 | Umney et al. |

(Continued)

FOREIGN PATENT DOCUMENTS

EP 1 467 063 A 10/2004

(Continued)

OTHER PUBLICATIONS

Axiam Incorporated Product Brochure of GMX 4000 Smart Stack™ Systems, "For Assembly of Aircraft Jet Engines and Industrial Gas Turbines" (1991—publication month not available).

(Continued)

*Primary Examiner*—Bryan Bui
(74) *Attorney, Agent, or Firm*—Hamilton, Brook, Smith & Reynolds, P.C.

(57) ABSTRACT

A computer method or corresponding system for optimally balancing a rotor assembly. The computer system defines a theoretical centerline based on a mathematical model of the rotor assembly. For each disc or component of the rotor assembly, the invention system calculates rotor blade or bolt and washer distribution, based on calculated centerline deviations and angular locations of the discs and effective weights of rotor blade or bolt-and-washer sets. The rotor blade or bolt-and-washer distribution provides locations for placement of the rotor blades or bolts-and-washers so as to offset the centerline deviations and thus correct imbalance of the rotor assembly.

25 Claims, 11 Drawing Sheets

U.S. PATENT DOCUMENTS

| | | |
|---|---|---|
| 5,768,149 A | 6/1998 | Umney et al. |
| 5,821,412 A | 10/1998 | Bryant et al. |
| 6,341,419 B1 | 1/2002 | Forrester et al. |
| 6,452,179 B1 | 9/2002 | Coates et al. |
| 6,473,794 B1 | 10/2002 | Guheen et al. |
| 6,484,574 B1 | 11/2002 | Douglas et al. |
| 6,519,571 B1 | 2/2003 | Guheen et al. |
| 6,563,074 B2 | 5/2003 | Bazukuri et al. |
| 6,898,547 B1 | 5/2005 | DeBlois et al. |
| 2002/0122583 A1 | 9/2002 | Thompson |
| 2005/0234576 A1 | 10/2005 | Lee |
| 2005/0265846 A1* | 12/2005 | Przytulski et al. ........... 416/144 |
| 2006/0010686 A1 | 1/2006 | Henning et al. |
| 2006/0013692 A1 | 1/2006 | Henning et al. |
| 2007/0014660 A1 | 1/2007 | Lee |
| 2007/0258669 A1 | 11/2007 | Lee |

FOREIGN PATENT DOCUMENTS

| | | |
|---|---|---|
| EP | 2067110 A1 | 6/2009 |
| GB | 2 423 341 A | 8/2006 |
| WO | WO 2008/039224 | 4/2008 |

OTHER PUBLICATIONS

Axiam Incorporated Product Brochure of Axiam's Rotor Assembly Process, Tools, & Training, "Build Engine Rotors Within Compliance Reduce Turn Time, Decrease Vibration and Cut Costs" (1991 — publication month not available).

International Search Report for International Application No. PCT/US2007/001448, date mailed Oct. 2, 2007.

International Preliminary Report on Patentability, PCT/US2007/001448, date of mailing Apr. 9, 2009.

* cited by examiner

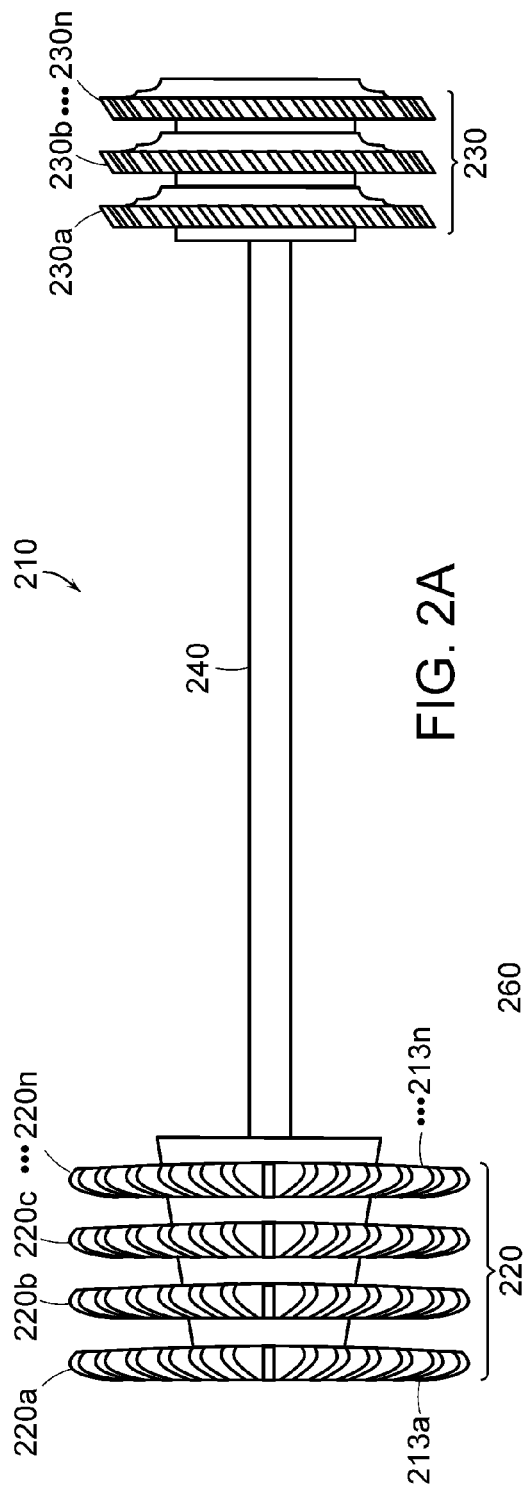
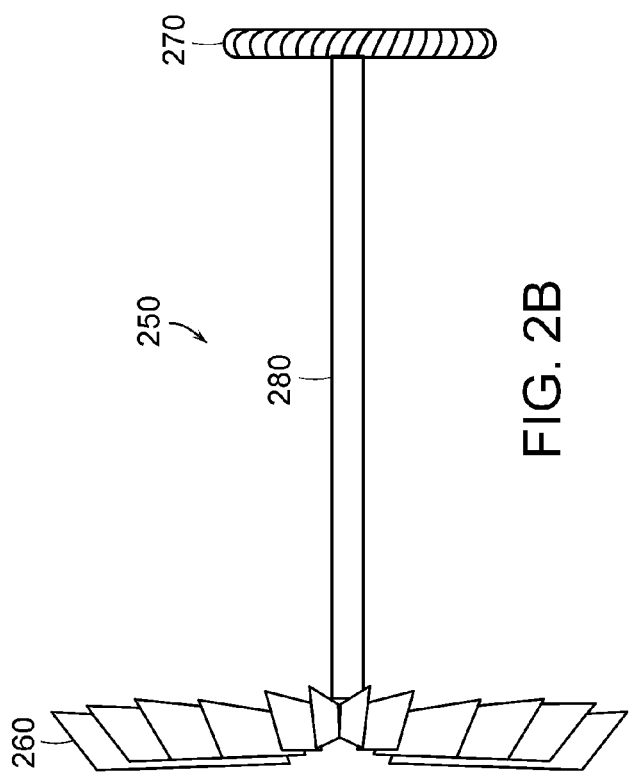

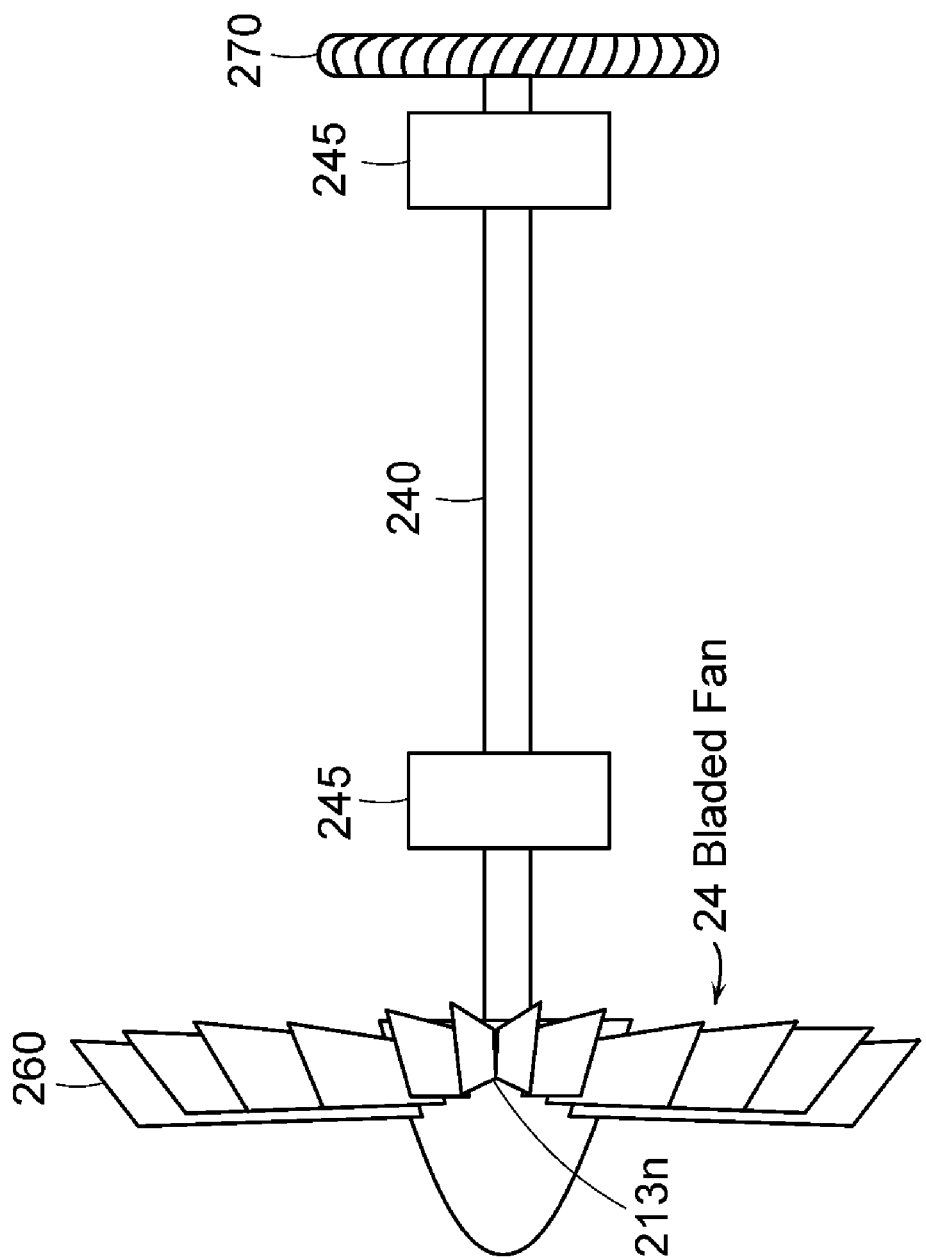

METHOD AND APPARATUS FOR GEOMETRIC ROTOR STACKING AND BALANCING

RELATED APPLICATION(S)

This application is a continuation of U.S. application Ser. No. 11/527,033, filed Sep. 26, 2006 now U.S. Pat. No. 7,539,594.

The entire teachings of the above application(s) are incorporated herein by reference.

BACKGROUND OF THE INVENTION

A bladed rotor, such as a rotor of a gas turbine engine, includes a central hub, one or more discs and a plurality of blades secured to respective discs and projecting outward from the hub. The bladed rotor having multiple rotor blades rotates about a longitudinal central axis. Because of non-uniform distribution of mass within the rotor assembly and the blades, it is difficult to achieve a perfect balance for a bladed rotor. However, minimizing imbalances within a rotor assembly is essential for minimizing vibration and noise and maximizing the efficiency and performance of the rotor (and turbine engine).

Currently, rotor assemblies are balanced by separately balancing each disc or component and aligning respective individual rotor discs or components in the assembly so that the high point of one disc is offset by the low point of its adjacent disc. The blades are distributed by mass about the theoretical geometric centerline of each disc. The main drawback of this approach is that it is a trial-and-error method which does not guarantee the optimal alignment of the rotor assembly because the separate centerline of each disc or component is not aligned with the centerline of the rotor assembly. For example, alignment of two rotor discs' centerlines may satisfactorily align those two discs, but introducing a third disc's high point or low point in the assembly may be impractical to align with the other two centerlines. The blades may then be redistributed about each disc in an arbitrary, trial-and-error manner in the hope of achieving some acceptable balance. A static balance machine may be used to add weights to the disc or blades to help in achieving a rudimentary balance. Consistency and repeatability is missing in this trial-and-error procedure.

SUMMARY OF THE INVENTION

The present invention addresses the shortcomings of the prior art and provides a computer method and system for balancing engine modules (e.g., rotor assemblies of a turbine engine).

A method or corresponding apparatus in an exemplary embodiment of the present invention calculates a best-fit stack of the discs and the optimal blade or bolt-and-washer distribution (for rotors with integrated blades and discs) about the centerline of rotation of the rotor assembly for a turbine engine. In particular, the present invention defines an actual centerline of a geometrical/mathematical model of a rotor assembly (module) as a whole. Based on the defined centerline, the system calculates a centerline deviation of each disc or component of the rotor assembly. Calculating the centerline deviation includes measurement characteristics of a set of rotor blades, a disc, a shaft, a hub, and/or a spacer. For each of these measurements, the following information is calculated: roundness, flatness, concentricity, concentricity angle, runout, runout angle, perpendicularity, perpendicularity angle, perpendicular plane deviation, centerline deviation, centerline deviation angle, biplane deviation, and biplane deviation angle. After calculating the best fit centerline deviation for each component, the invention system determines an angular location of the component of the turbine engine.

Next, the invention system determines the centerline deviation and angle of each disc based on the centerline of both ends of the subject module as stacked and determines disc blade distribution within the turbine engine based on the calculated centerline deviation and the angular location of the disc/component of the turbine engine. Determining rotor blade distribution includes weighing of each rotor blade for the disc/component of the turbine engine by either pan weight or moment weight, as appropriate.

Each rotor blade of the set of rotor blades for a given disc may be identified by a number label (indicator) and a blade weight. Further, determining the blade distribution may also include computing a rotor blade distribution in order to offset the centerline deviation. The process of offsetting the discs' centerline deviation optimally balances the rotor assembly/module of the turbine engine.

This rotor blade distribution per disc is displayed to a user in both a numerical and graphical format. After determining the rotor blade distribution, the rotor blades may be assembled on each disc of the turbine engine using the displayed information. The resulting rotor assembly is then verified against the computer model prediction. If the blades are integral to their discs, then the distribution is in the form of bolts and washers (bolts connect discs to each other in the assembly). It should be understood that this method or corresponding apparatus in an exemplary embodiment may be applied to a low-pressure turbine, intermediate-pressure turbine, a high pressure turbine, a low-pressure compressor, an intermediate-pressure compressor, a high pressure compressor, a combination of rotors, or a combination of rotors with their respective shafts or hubs.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2A is a plane view of a high pressure compressor and turbine modules;

FIG. 2B is a plane view of a low pressure compressor and turbine modules;

FIG. 2C is a plane view of a low pressure shaft and low-pressure compressor and turbine modules, including a pair of bearing housings;

DETAILED DESCRIPTION OF THE INVENTION

A description of preferred embodiments of the invention follows.

Figure 1:
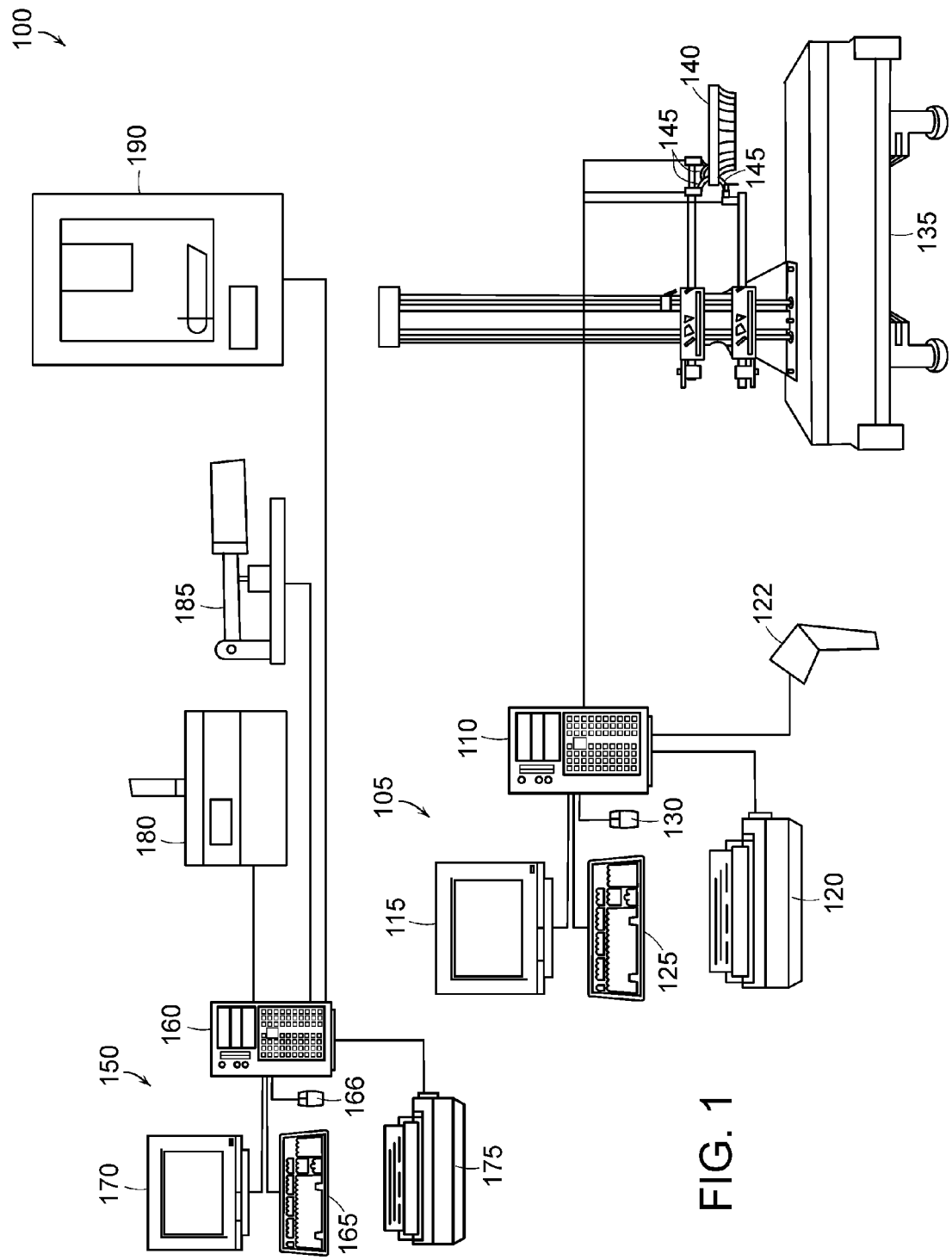
FIG. 1 is a side view of a system embodying the present invention.

FIG. 1 is a system 100 of the present invention for calculating a rotor blade or bolt-and-washer distribution (or disc thereof) or other component 140 that achieves optimal balance throughout a module (rotor assembly) in a turbine engine. It is useful to note that calculating the rotor blade or bolt-on-washer distribution is typically performed in such a manner as to have an optimal straight build of a rotor assembly. The system 100 uses a determination module 105 for performing calculations. Within the determination module 105, there is a digital processing unit (with CPU) 110, a display monitor 115, a printer 120, a bar code reader 122, and input devices 125 and 130, such as a keyboard or mouse. The determination module 105 interacts with at least one sensor or probe 145 located on a vertical gage 135. The vertical gage 135 has a disc, disc and blade assembly, or other component 140 on a stand in such a manner as to allow at least one sensor or probe 145 to make measurements. These measurements are transmitted to the determination module 105 where they are used for calculating a best fit stack of discs and balanced module rotor blade or bolt-and-washer distribution according to the principles of the present invention. The determination module 105 having received the sensor measurement information/data from at least one sensor or probe 145, calculates a disc or component (e.g. shafts, hub, etc.) location, with respect to a defined centerline for assembly purposes.

In addition, the system 100 uses a determination module 150 for performing measurements. Within the determination module 150, there is a digital processing unit (with CPU) 160, a display monitor 170, a printer 175, and input devices 165 and 166, such as a keyboard or mouse. The determination module 150 interacts with either a pan weight scale 180 or a moment weight scale 185. The pan weight scale 180 determines the weight of blades, except in those instances where a moment weight is required. If the moment weight is required, the moment weight scale 185 calculates the moment weight. After calculating the weight, the CPU 160 stores the calculated/measured weight using an identification number associated to a specific disc. A bar code printer 190 identifies (produces) a barcode and the identification number that are associated with the specific disc. Bar code reader 122 reads the printed bar code as input for determination module 105.

FIG. 2A shows a high-pressure spool 210 of a gas turbine. The high-pressure spool 210 includes a high-pressure compressor 220, a high-pressure turbine 230, and a high-pressure shaft 240. The high-pressure compressor 220 includes a plurality or rotor blades 220a . . . 220n, each set of blades being carried by a respective disc 213a . . . n. The high-pressure turbine 230 includes a plurality of rotor blades 230a . . . 230n, each set of blades being carried by a respective disc 230a . . . n.

FIG. 2B shows a low-pressure spool 250 of a gas turbine. The low-pressure spool 250 includes a low-pressure compressor 260, a low-pressure turbine 270, and a low-pressure shaft 280. The low-pressure shaft 280 rotates within the high-pressure shaft 240. In some engine designs, the high-pressure shaft 240 and the low-pressure shaft 280 is the same shaft. It is useful to note that in some engine designs an intermediate shaft compressor (not shown) and discs may also be used.

FIG. 2C generally shows a low-pressure shaft 240 and a low-pressure compressor 260 extending through a pair of bearing housings 245. The proper alignment of a rotor assembly with the centerline through the bearings can reduce the vibration and imbalance of the rotor assembly and turbine engine. One such useful component to align is the disc 213n carrying the plurality of rotor blades 220 or rotor blade fan 24. An oil circulation system delivers lubricating oil to lubricate the bearings (not shown) within the respective bearing housings 245, wherein the oil flows through the bearings for drainage to a sump, not shown, within a lower region of the bearing housing 245. As will be readily understood, proper alignment of components of each bearing housing 245 will substantially reduce the onset of oil leakage. Further, proper alignment of the dynamic and static structures of each bearing can reduce rapid wear of the seal structures. Alignment of the disc 213n carrying the plurality of rotor blades 220 or blade fan 24 is as follows:

Characteristic information of each part (e.g., disc 213, rotor blades 220, etc.) is measured and input to a software program (e.g., "SuperStack" by AXIAM, Incorporated of Gloucester, Mass.) of the determination module 105 of FIG. 1. The software program uses the input characteristic measurements to generate output characteristic measurements for aligning discs 213 and the plurality of rotor blades 220. In particular, the software program outputs correct balancing information in the form of a rotor blade or bolt-and-washer distribution. The rotor blade or bolt-and-washer distribution is computed by 1) calculating a centerline deviation of each rotor disc with respect to the centerline of the rotor assembly (module) as a whole (from end to end); 2) calculating an angular location of each rotor disc; and 3) determining the rotor blade or bolt-and-washer distribution based on the centerline deviation and angular location of each rotor disc.

Referring now to the centerline deviation, the measurement characteristics include those of a set of rotor blades, a disc, a shaft, a hub, and a spacer. For each part measurement, the software program mathematically levels and centers the part. The software program builds a mathematical model for the parts as hypothetically placed together to form a rotor assembly or module. The software program defines from end to end (including bearings or journals) an assembly model theoretical centerline. Using the theoretical centerline, the software program calculates geometric measurements of each part including: roundness, flatness, concentricity, concentricity angle, runout, runout angle, perpendicularity, perpendicularity angle, perpendicular plan deviation, centerline deviation, centerline deviation angle, biplane deviation and biplane deviation angle. Using these measurement characteristics, a rotor blade or bolt-and-washer distribution for the plurality of rotor blades in the subject rotor assembly (module) is calculated. In particular, the software program calculates the location of each part in space. Using a known weight of each part (user input data such as gross weight, moment weight or manufacturing weight, e.g., from bar code reading in FIG. 1) and the foregoing measurement characteristics (calculated geometric measurements), the software program calculates a blade or bolt-and-washer distribution which offsets centerline deviations and balances the overall subject rotor assembly. In a preferred embodiment, this is accomplished using Applicants' mathematical formula/process which is illustrated in FIG. 2D.

Figure 2D:
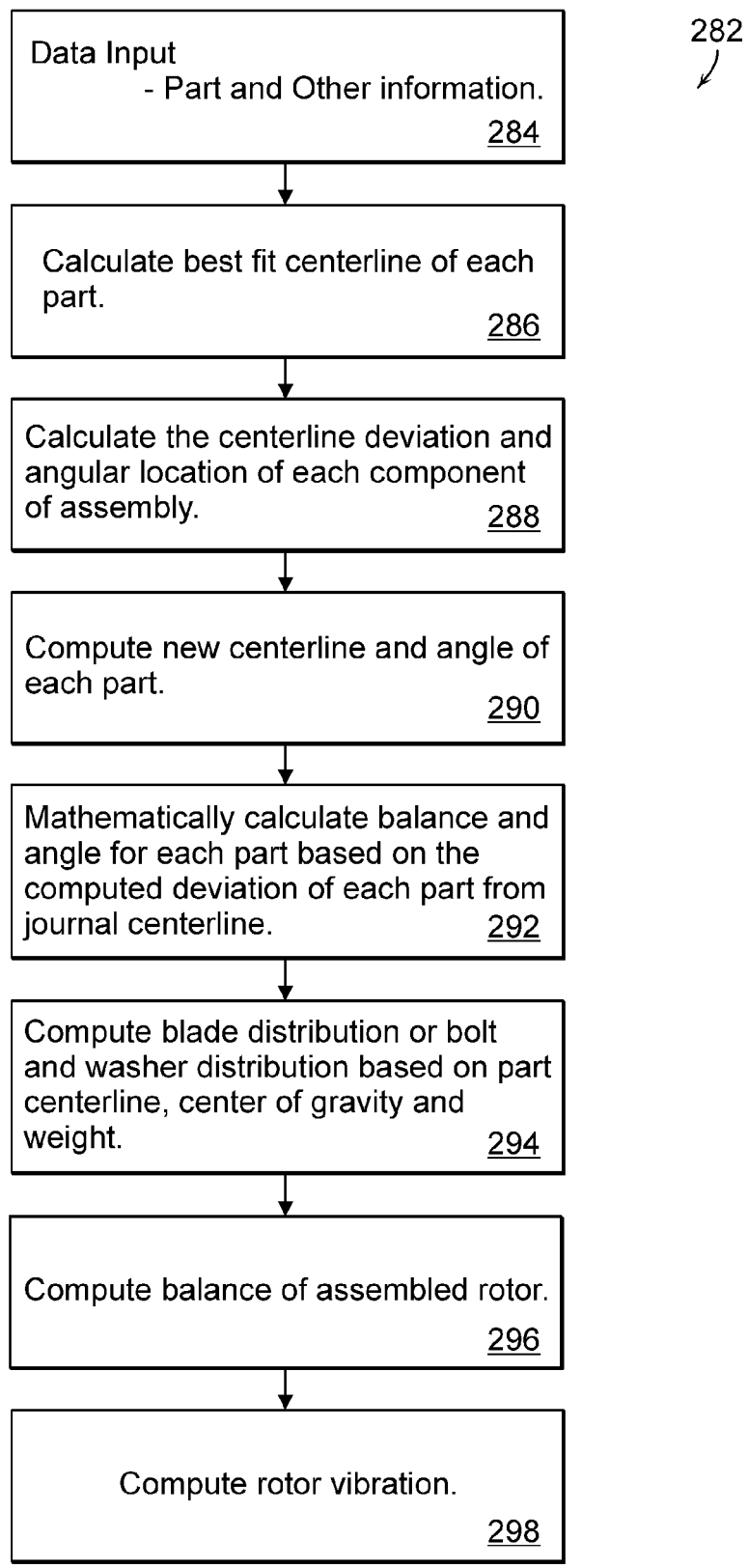
FIG. 2D is a flow diagram of an example process used to determine the predicted rotor assembly and rotor blade distribution.

FIG. 2D is an information flow diagram 282 that represents the mathematical formulas used in rotor assembly and blade or bolt-and-washer distribution of the present invention. More specifically, the process calculates a straight rotor assembly against a centerline between bearing journals. At step 284, the process inputs data that relates to part and other information. The part information includes height, diameter, weight, center of gravity location, probe location, number of bolt holes, bolt hole radius, and individual blade weight whereas other information includes rotor speed, part with bearing journal, number of blades, bolt weight, and washer weight. After receiving the data input, step 286 calculates the best fit centerline for each part in the assembly. The calculation uses Homogeneous Transformation Matrix (HTM) mathematics for each part from established datum to predict a straight assembly. In particular, the HTM uses probe locations and number of bolt holes data received in step 284 allowing the process to calculate the centerline deviation and angular location of each component of the assembly in step 288. After calculating the centerline and angular location, the process creates a new centerline and angle of each part at step 290 using the probe locations and number of bolt holes. The process mathematically translates the centerline of the assembly to two bearing journal centerlines in such a manner as to create a new centerline and angle for each part. At step 292, the process mathematically calculates balance and angle for each part based on a computed deviation of each part from the journal centerline. In calculating the balance and angle, the process uses the following data: centerline deviation, centerline deviation angle, center of gravity location, weight, height, and diameter. Next, at step 294 the process computes a blade distribution or bolt and washer distribution based on the part centerline, center of gravity and weight. In computing the blade or bolt and washer distribution, the process uses the following data: centerline deviation, centerline deviation angle, center of gravity location, part weight, and blade weight. Next, the process computes the balance of the assembled rotor (step 296) and then a projected rotor vibration (step 298). In computing the rotor balance and vibration, the process uses the following data: balance deviation of each plane, rotor weight and rotor speed. In this way, the process predicts rotor assembly and rotor blade distribution.

It should be understood by one skilled in the art that the alignment of a plurality of rotor blades or bolts-and-washers 220n may be applied to a low-pressure turbine, an intermediate-pressure turbine, a high-pressure turbine, a low-pressure compressor, an intermediate-pressure compressor, or a high-pressure compressor.

Figure 3:
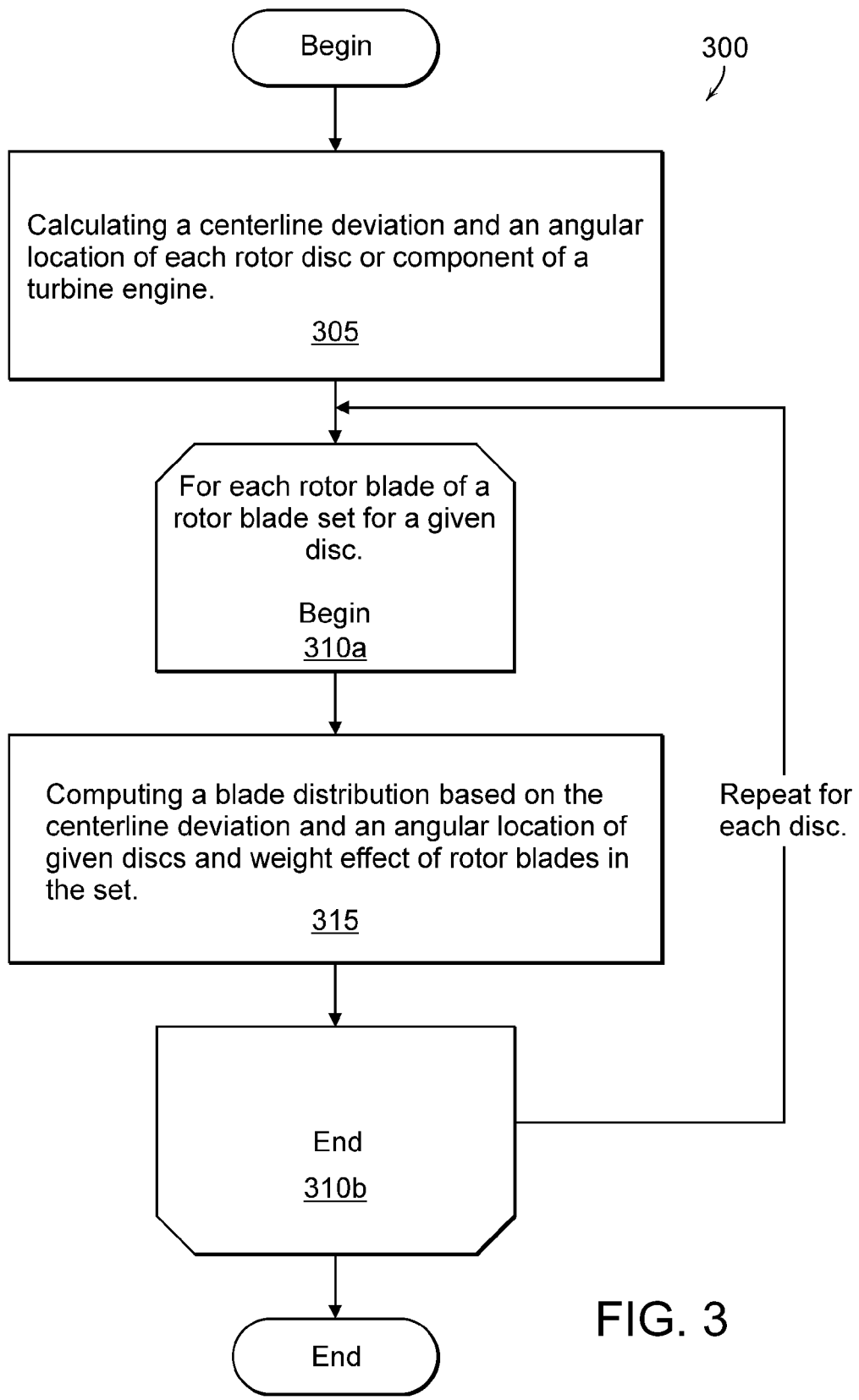
FIG. 3 is a flow diagram of an example process of calculating rotor blade or bolt-and-washer distribution for a disc of a turbine engine rotor according to the present invention.

FIG. 3 is a flow diagram 300 illustrating an example process of computing a blade or bolt-and-washer distribution for a disc of a turbine engine according to the present invention. After defining the model centerline, the blade or bolt-and-washer distribution process 300 calculates a centerline deviation and an angular location of each rotor disc or component of the turbine engine (step 305). Further, the process computes a blade distribution for each rotor blade in a set of rotor blades of a given disc (steps 310a, 310b and 315). Next, the process calculates the weight distribution based on the centerline deviation and angular location of the given disc (as calculated in 305) and the weight effects of each blade or bolt-and-washer in the set.

Figure 4:
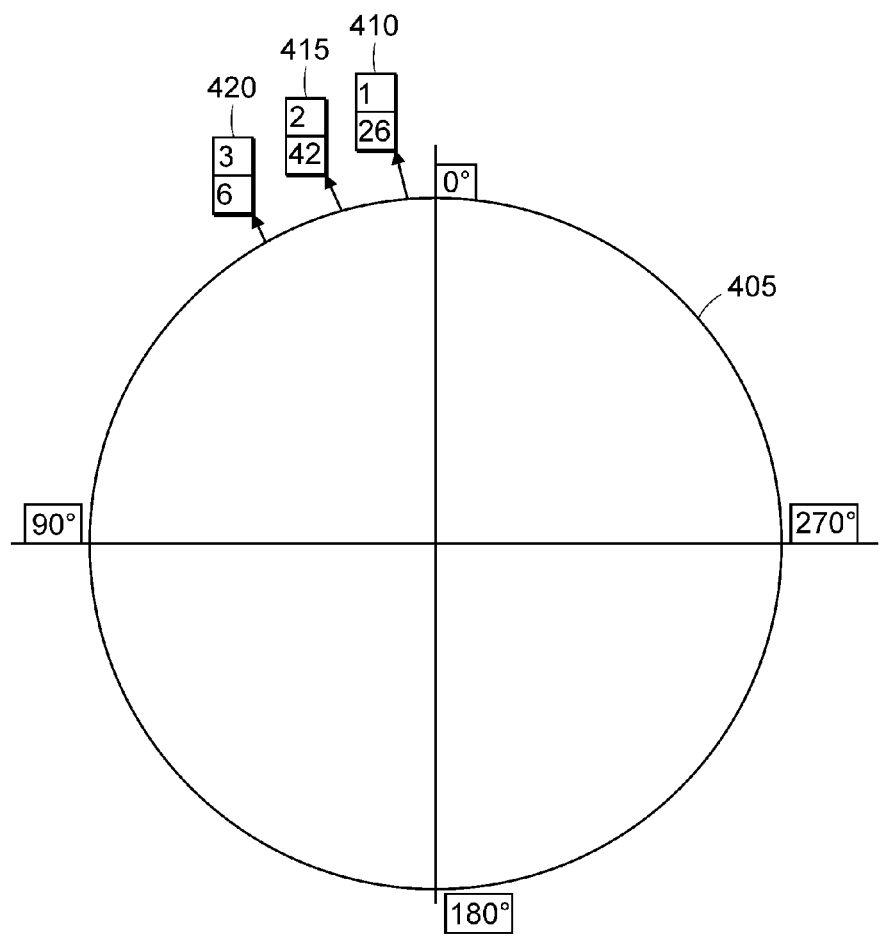
FIG. 4 is a schematic diagram of a rotor blade or bolt-and-washer distribution about a given disc.

FIG. 4 is a schematic diagram of a rotor blade or bolt-and-washer distribution 400 for a given disc 213 of FIG. 2A. A turbine engine rotor disc 405 is seen in such a manner as to view the location of rotor blades or bolts-and-washers 410, 415, and 420. Rotor blade 410 is labeled or identified as blade number 26 and is shown in slot or blade location number 1 of the subject disc. Rotor blade 415 is shown in blade location number 2 and has identifier number 42. Similarly rotor blade 420 is shown in slot/blade location 3 and identified as blade number 6. The placement of each rotor blade is based on the rotor blade distribution described above. In particular, the rotor blades 410, 415, and 420 are positioned (assigned a slot/blade position) in such a way as to geometrically balance the given rotor component or disc to the theoretical centerline of the rotor assembly by offsetting the disc's calculated centerline deviation and angular location with the weight of each rotor blade.

Figure 5:
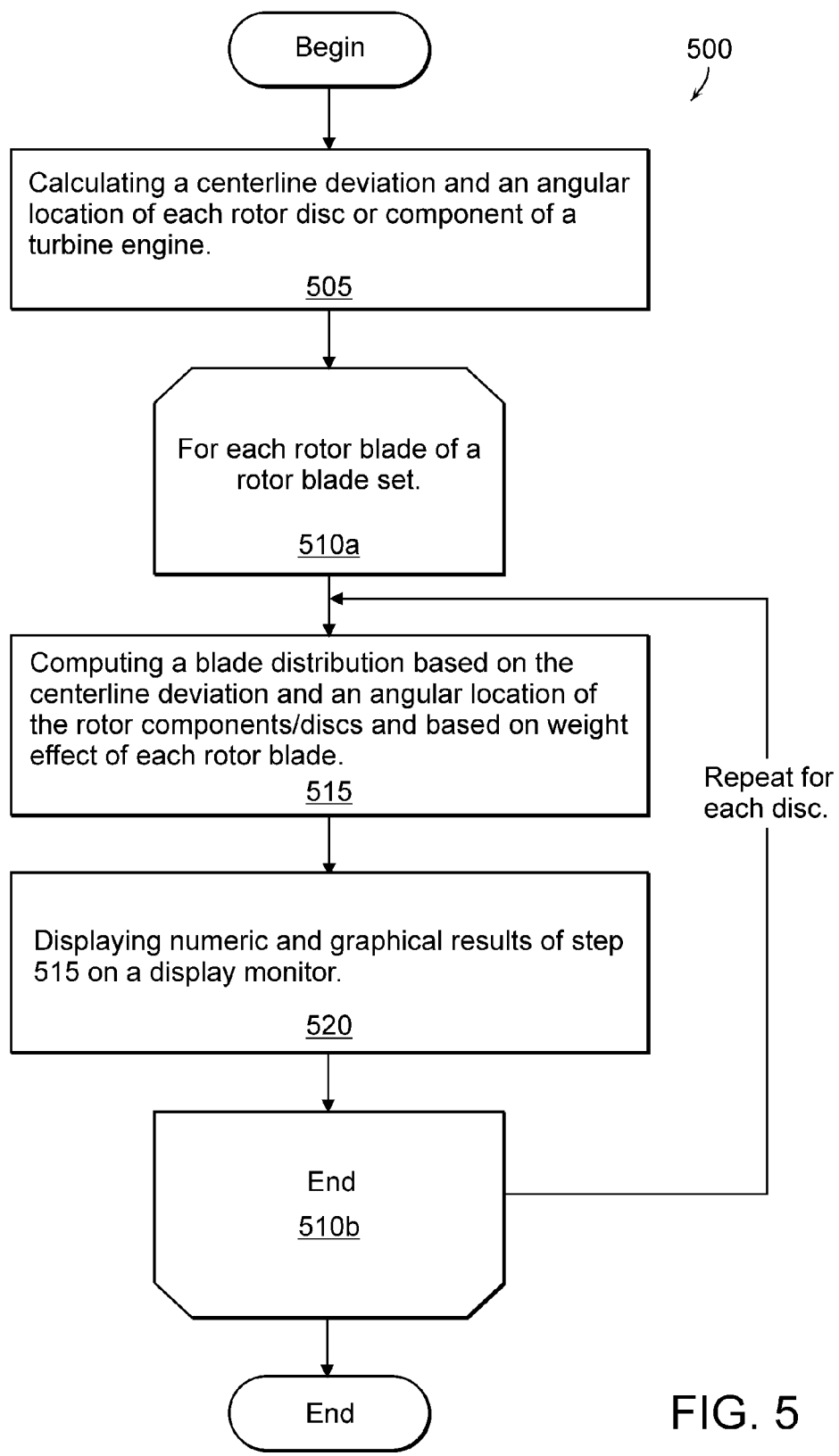
FIG. 5 is a flow diagram of an example process of displaying rotor blade or bolt-and-washer distribution information to a user according to the present invention.

FIG. 5 is a flow diagram 500 illustrating an example displaying process of blade or bolt-and-washer distribution information. Before displaying blade or bolt-and-washer distribution information, the distribution information is calculated as described above. At step 505, the process calculates a centerline deviation and angular location for each rotor disc or component of a turbine engine. For each rotor disc of a rotor assembly, the process computes a blade distribution (loop 510a through 510b). Next, at step 515, the process computes blade or bolt-and-washer distribution based on (a) the centerline deviations and angular locations of components/discs of the turbine engine as calculated in step 505, and (b) weight effects of the blades or bolts-and-washers per blade or bolt position. From the results of step 515, the process 500 displays numerical and graphical results illustrating blade position per disc on a display monitor (step 520).

Figure 6:
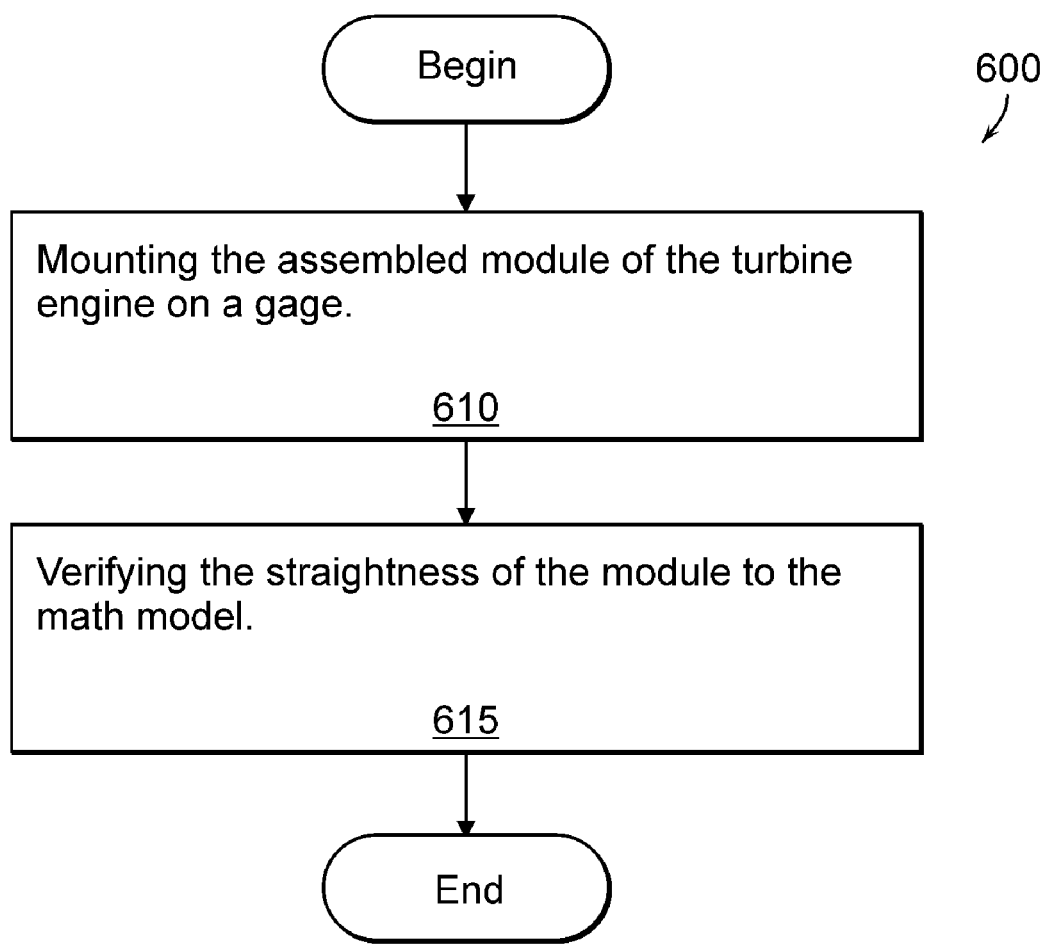
FIG. 6 is a flow diagram of an example process of mounting a rotor module and verifying the straightness of the module in the present invention.

FIG. 6 is a flow diagram 600 of an example process of verifying a subject module (e.g., rotor assembly of a turbine engine) against the initial predictive mathematical model. The process mounts the subject module on a gage (step 610). Next, as measured by the gage, the process compares location and orientation of the module to that of the mathematical model. Based on the comparison, the process verifies the straightness of the subject module to the predictive mathematical model (step 615).

Figure 7:
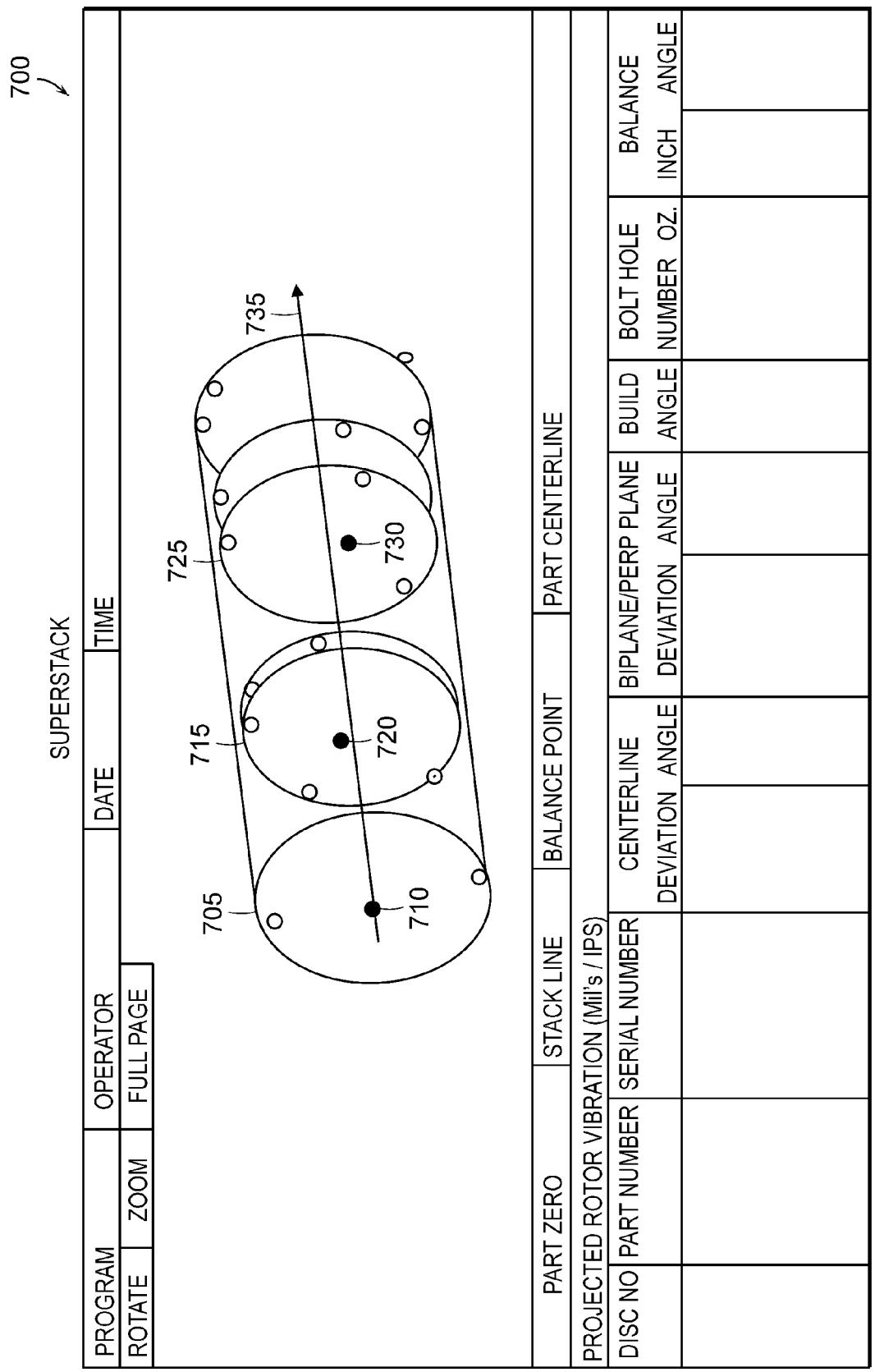
FIG. 7 is a screen view diagram of a rotor disc stacking process and blade or bolt-and-washer distribution employing the present invention.

FIG. 7 is a schematic diagram of a rotor disc stacking and balancing (blade distribution) output 700 of a preferred embodiment. A set of rotor discs 705, 715, and 725 are shown with their respective individual or part center 710, 720, and 730, respectively. The rotor assembly as a whole has a defined centerline shown at 735. The centerline 735 depicts a theoretical model centerline, a centerline deviation, and an angular location of each rotor disc 705, 715, and 725. Rotor blade or bolt-and-washer distribution are indicated by balance points (shaded dots) which result from the above described computation relating to calculated centerline deviations and the angular locations of discs to weight effects of rotor blades or bolts-and-washers at blade locations of the disc. The rotor blade or bolt-and-washer distribution allows for an aligned stacking of each rotor disc 705, 715 and 725.

It is useful to note that using the foregoing output 400, 700, (e.g., blade or bolt-and-washer distribution information of FIG. 4 and rotor disc stacking and balancing of FIG. 7) one is able to optimally assemble a module (e.g., rotor assembly) of the turbine engine.

Figure 8:
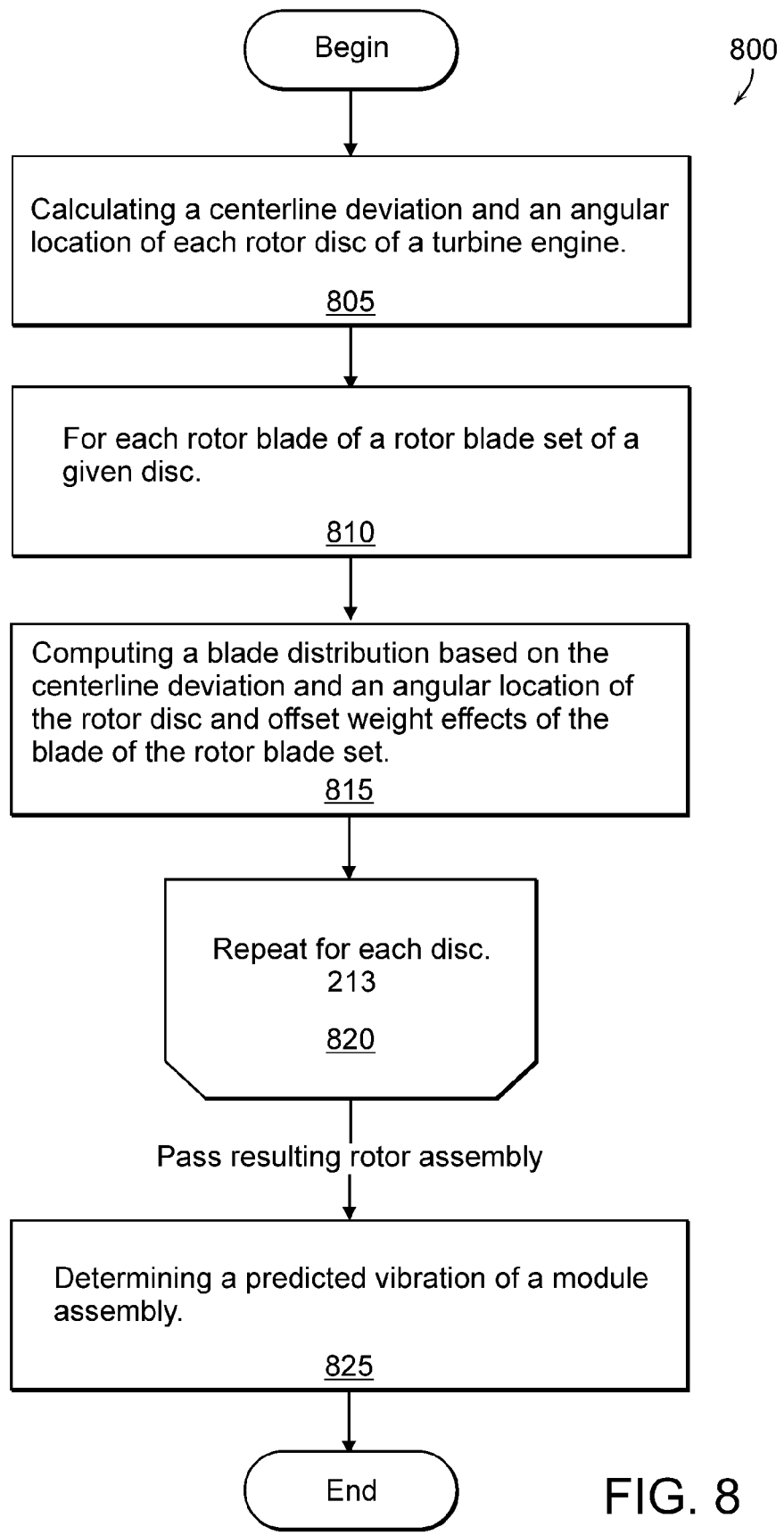
FIG. 8 is a flow diagram illustrating an example process of determining a predicted vibration of a rotor module and set of rotor blades utilized in embodiments of the present invention.

FIG. 8 is a flow diagram 800 illustrating an example process of determining a predicted vibration of a module assembled according to the above. The process 800 receives input of a manufacturer-specified operating speed of the rotor. Receiving the specified operating speed allows one to adjust for vibration using known techniques given the results of process 800 such as the weight distribution of disc 213, associated blade sets or bolts-and-washers and other rotor components (resulting from the output 700 of FIG. 7). Step 805 measures and calculates a centerline deviation and an angular location for each rotor disc of the assembled engine. Next, the process makes a computation of the blade or bolt-and-washer distribution and a determination of the predicted vibration for each rotor disc (steps 810 through 820). In particular, step 815 computes a blade or bolt-and-washer distribution based on the centerline deviation and angular location of the disc and/or component with respect to the measured centerline of the turbine engine (as calculated in step 805) and offset weight effects of the blades in terms of displacement and velocity. After the last iteration of step 820, the process determines a predicted imbalance of a set of rotor blades or bolts-and-washers for each rotor disc 213. It is useful to note the rotor vibrations may be determined while the turbine is in an operational state (i.e., test cell). Next, the process determines the predicted vibration of a module assembly (step 825). That is, predicted vibration enables one to determine in advance of operation if the subject rotor assembly does not meet vibration threshold/criteria.

Figure 9:
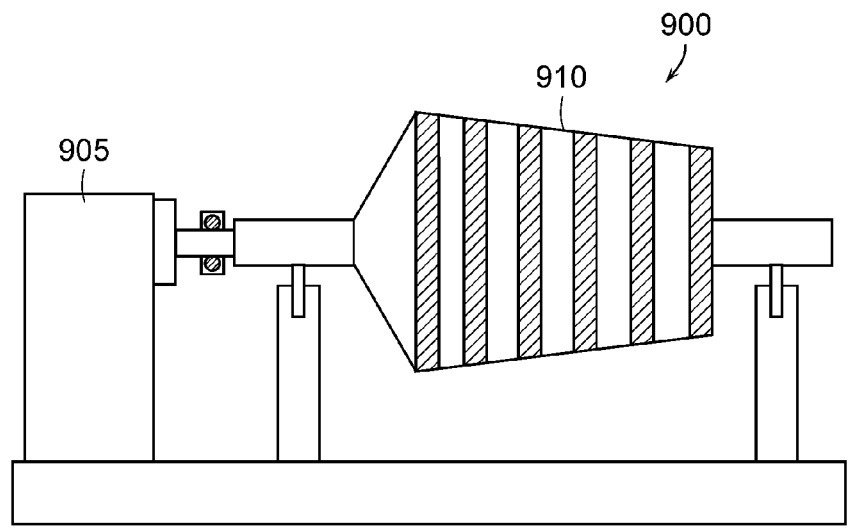
FIG. 9 is a schematic diagram of a rotor assembly on a balancing machine as employed by the present invention process of FIG. 10.

FIG. 9 is a schematic diagram of a balancing machine assembly 900. Specifically, a balancing machine 905 contains a module 910 for balance testing. More specifically, the module 910 is installed in the balancing machine 905 for verification of an initial unbalance in two different planes (e.g., left and right plane). Verification is performed using the mathematical model described above.

Figure 10:
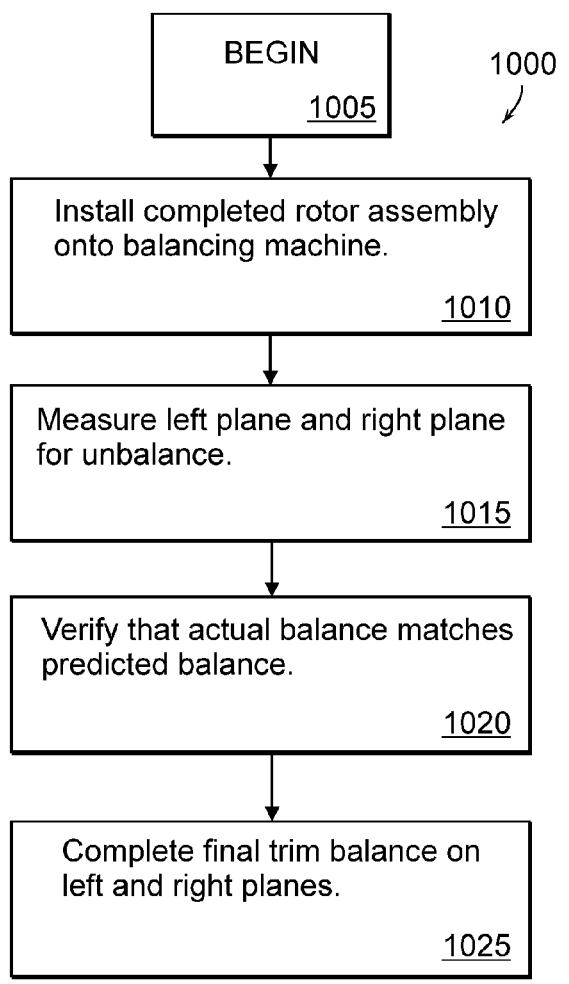
FIG. 10 is a flow diagram illustrating an example process of balancing a rotor assembly.

FIG. 10 is a flow diagram illustrating an example process 1000 of balancing a rotor assembly. After beginning (step 1005), the process installs a completed rotor assembly onto a balancing machine (step 1010) such as that illustrated in FIG. 9. Next, the process measures a left plane and a right plane of the rotor assembly to check for any unbalances or imbalances (step 1015). After measuring the planes, the process verifies the actual balance by comparing the actual values with previously computed predicted balance values (step 1020). After verifying the actual balance, the process 1000 completes a final trim balance on the left and right planes as indicated by the verification process (step 1025).

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer-based method for correcting imbalance of a rotor assembly for a turbine engine, comprising the steps of:
   given a rotor assembly formed of discs and components, each disc for carrying a respective set of rotor blades or bolts-and-washers;
   using a computer, calculating for each disc and component of the rotor assembly a respective centerline deviation and an angular location of the disc and component with respect to a centerline of the rotor assembly defined based on a mathematical model of the rotor assembly; and
   iterating through the computer rotor blade and bolt-and-washer distributions and determining through the computer rotor blade and bolt-and-washer distribution throughout the rotor assembly based on (a) the calculated centerline deviations and the angular locations of the discs and components of the rotor assembly and (b) respective weight of each rotor blade or bolt-and-washer, the rotor blade or bolt-and-washer distribution providing rotor blade or bolt-and-washer locations which offset the centerline deviations by weight and result in a balanced rotor assembly.

2. The computer-based method of claim 1, wherein the step of determining through the computer rotor blade or bolt-and-washer distribution includes weighing a set of rotor blades or bolts-and-washers of the turbine engine by pan weight or moment weight.

3. The computer-based method of claim 1, further comprising marking each rotor blade or bolt-and-washer with an identifying number and the blade location about a respective disc.

4. The computer-based method of claim 1, wherein the step of determining through the computer rotor blade or bolt-and-washer distribution further includes for each disc, computing the locations of respective rotor blades or bolts-and-washers to offset the centerline deviation of the disc.

5. The computer-based method of claim 1, further comprising displaying an indicator of the determined rotor blade or bolt-and-washer distribution to a user.

6. The computer-based method of claim 5, wherein the indication of the determined rotor blade or bolt-and-washer distribution is displayed in numerical format.

7. The computer-based method of claim 5, wherein the indication of the rotor blade or bolt-and-washer distribution is displayed in graphical format.

8. The computer-based method of claim 5, further including assembling the rotor blades or bolts-and-washers on the respective disc based on the displayed information.

9. The computer-based method of claim 8, further including verifying the rotor assembly resulting from the assembly, against the mathematical model.

10. The computer-based method of claim 1, wherein the step of calculating includes determining measurement characteristics in any combination of: roundness, flatness, concentricity, concentricity angle, runout, runout angle, perpendicularity, perpendicularity angle, perpendicular plane deviation, centerline deviation, centerline deviation angle, biplane deviation and biplane deviation angle.

11. The computer-based method of claim 1, wherein the rotor assembly is assembled into any of a low-pressure turbine, an intermediate-pressure turbine, a high-pressure turbine, a low-pressure compressor, an intermediate-pressure compressor, or a high-pressure compressor.

12. The computer-based method of claim 11, wherein the step of defining a centerline of the rotor assembly includes determining a centerline generated between bearing journals.

13. A computer system for correcting imbalance of a rotor assembly for a turbine engine, comprising:
   given a rotor assembly being formed of discs and components, each disc for carrying a respective set of rotor blades or bolts-and-washers, a calculation module configured to calculate a centerline deviation and an angular location of the disc and component for each disc and component of the rotor assembly with respect to a defined centerline of the assembly based on a mathematical model of the rotor assembly; and
   a determination module configured to iterate rotor blade and bolt-and-washer distributions and to determine rotor blade or bolt-and-washer distribution throughout the rotor assembly based on (a) the calculated centerline deviations and the angular locations of the discs and components of the rotor assembly and (b) respective weight of each rotor blade or bolt-and-washer, the rotor blade or bolt-and-washer distribution providing rotor blade or bolt-and-washer locations which offset the centerline deviations and result in an optimally balanced rotor assembly.

14. The computer system of claim 13 wherein the determination module weighs a set of rotor blades or bolts-and-washers of the turbine engine by pan weight or moment weight.

15. The computer system of claim 13, further comprising a marking module configured to mark each rotor blade or bolt-and-washer with an identifying number and the location about a respective disc.

16. The computer system of claim 13 wherein the determination module computes the locations of respective rotor blades or bolts-and-washers to offset the centerline deviation of the disc for each disc.

17. The computer system of claim 13 wherein a display module is configured to display an indication of the determined rotor blade or bolt-and-washer distribution to a user.

18. The computer system of claim 17, wherein the indication of the determined rotor blade or bolt-and-washer distribution is displayed in numerical format.

19. The computer system of claim 17, wherein the indication of the rotor blade or bolt-and-washer distribution is displayed in graphical format.

20. The computer system of claim 17, further comprising an assembly module configured to assemble the rotor blades or bolts-and-washers on the respective disc based on the displayed information.

21. The computer system of claim 20, further including a verification module configured to verify the rotor assembly resulting from the assembly, against the mathematical model.

22. The computer system of claim 13, wherein the calculation module is further configured to determine measurement characteristics in any combination of: roundness, flatness, concentricity, concentricity angle, runout, runout angle, perpendicularity, perpendicularity angle, perpendicular plane deviation, center-line deviation, centerline deviation angle, biplane deviation and biplane deviation angle.

23. The computer system of claim 13, wherein the rotor assembly is assembled into any of a low-pressure turbine, an intermediate-pressure turbine, a high-pressure turbine, a low-pressure compressor, and intermediate-pressure compressor, or a high-pressure compressor.

24. The computer system of claim 13, wherein a definition module is further configured to determine a centerline generated between bearing journals of the rotor assembly.

25. The computer system of claim 13, wherein the rotor assembly is assembled into a low shaft, intermediate shaft, or high shaft, respectively to meet target vibration threshold/criteria.

* * * * *